US010026979B2

(12) United States Patent
Kang et al.

(10) Patent No.: US 10,026,979 B2
(45) Date of Patent: Jul. 17, 2018

(54) APPARATUS AND METHOD FOR CONTROLLING FUEL CELL SYSTEM USING RECONFIGURABLE SWITCH NETWORK

(71) Applicants: SK INNOVATION CO., LTD., Seoul (KR); SNU R&DB FOUNDATION, Seoul (KR)

(72) Inventors: Byung Hee Kang, Daejeon (KR); Seong Je Wu, Daejeon (KR); Kyung Bin Yoo, Daejeon (KR); Naehyuck Chang, Seoul (KR); Jaemin Kim, Seoul (KR)

(73) Assignees: SK INNOVATION CO., LTD., Seoul (KR); SNU R&DB FOUNDATION, Seoul (KR)

( * ) Notice: Subject to any disclaimer, the term of this patent is extended or adjusted under 35 U.S.C. 154(b) by 600 days.

(21) Appl. No.: 14/660,750

(22) Filed: Mar. 17, 2015

(65) Prior Publication Data
US 2015/0270563 A1    Sep. 24, 2015

(30) Foreign Application Priority Data
Mar. 18, 2014    (KR) .................... 10-2014-0031600

(51) Int. Cl.
| H01M 8/04 | (2016.01) |
|---|---|
| H01M 8/04664 | (2016.01) |
| H01M 8/04858 | (2016.01) |
| H02J 1/10 | (2006.01) |
| H02J 1/08 | (2006.01) |
| H02J 1/00 | (2006.01) |

(52) U.S. Cl.
CPC ... *H01M 8/04671* (2013.01); *H01M 8/04925* (2013.01); *H02J 1/08* (2013.01); *H02J 1/10* (2013.01); *H02J 2001/004* (2013.01)

(58) Field of Classification Search
None
See application file for complete search history.

(56) References Cited

U.S. PATENT DOCUMENTS

| 2002/0192521 | A1* | 12/2002 | Raiser | ............... H01M 8/04029 |
|---|---|---|---|---|
|  |  |  |  | 429/430 |
| 2004/0033398 | A1* | 2/2004 | Kearl | ............... H01M 8/04604 |
|  |  |  |  | 429/429 |
| 2004/0219399 | A1* | 11/2004 | Zhu | .................... B60L 11/1887 |
|  |  |  |  | 429/431 |

(Continued)

FOREIGN PATENT DOCUMENTS

JP    2005-526363    9/2005

*Primary Examiner* — Eli Mekhlin
(74) *Attorney, Agent, or Firm* — IP & T Group LLP (57) ABSTRACT

Disclosed herein is an apparatus for controlling a fuel cell system, which includes multiple hot boxes including multiple fuel cell stacks, using a reconfigurable network having linear switching complexity, includes: a power conversion system for supplying outputs of normal stacks among the multiple fuel cell stacks to a load; at least one auxiliary power conversion system for supplying an output of at least one deteriorated stack among the multiple stacks to a load; a reconfigurable switch network for connecting in series or in parallel stacks of any hot box to stacks of another hot box; and a control unit for controlling an operation of the reconfigurable switch network by detecting a state of each of the stacks.

9 Claims, 7 Drawing Sheets

(56) References Cited

U.S. PATENT DOCUMENTS

2005/0019621 A1* 1/2005 Ikuma ............... H01M 8/04246
60/706
2008/0274386 A1* 11/2008 Hsieh ................ H01M 8/04037
429/515

* cited by examiner

APPARATUS AND METHOD FOR CONTROLLING FUEL CELL SYSTEM USING RECONFIGURABLE SWITCH NETWORK

CROSS REFERENCE TO RELATED APPLICATION

This application claims the benefit of Korean Patent Application No. 10-2014-0031600, filed Mar. 18, 2014, entitled "APPARATUS AND METHOD FOR CONTROLLING FUEL CELL SYSTEM USING RECONFIGURABLE SWITCH NETWORK", which is hereby incorporated by reference in its entirety into this application.

BACKGROUND OF THE INVENTION

1. Field of the Invention

The present invention generally relates to an apparatus and method for controlling a fuel cell system and, more particularly, to an apparatus and method for controlling a fuel cell system using a reconfigurable switch network.

2. Description of the Related Art

A fuel cell stack indicates a structure in which dozens to hundreds of fuel cells are stacked and connected to obtain required electric power outputs. When multiple fuel cell stacks are connected to each other rather than enlarging the size of the fuel cell stack due to a problem of fuel cell yield, etc. for a high capacity of the fuel cell system, the multiple stacks are connected in series, in parallel, or in series-parallel.

However, when the multiple stacks are simply connected in series-parallel, as the deterioration rates of the stacks are different from each other, the stacks may be adversely affected by more deteriorated stacks, thus causing acceleration of the deterioration of the whole fuel cell system. Particularly, when the stacks are connected in parallel, the stacks have the same voltage and current is crowded to a normal stack according to current-voltage curves of the stacks. Consequently, when multiple stacks are used by being connected in parallel, if deterioration occurs in a stack, current load is crowded in a normal stack, thus negatively influencing the life and durability of the normal stack.

The patent document mentioned in the following documents of related art discloses power source equipment with an adjustable array of fuel cell systems. When a fuel cell system malfunctions or has a defect, the power source equipment with an adjustable array of fuel cell systems disconnects the fuel cell system from a common power bus using a switch and connects a dual fuel cell system to the common power bus to supply stable power to loads. However, the patent document does not disclose an apparatus or method for reconfiguring stack to separately control fuel cell stacks that are deteriorated due to performance degradation.

Consequently, required is an apparatus and method for controlling a fuel cell system having amount of switches which is linearly related with stack amount, which may minimize to spread degradation of some stacks to other normal stacks by separating stacks in which deterioration occurs from a main Power Conversion System (PCS) through reconfiguration of the stacks, and may minimize the life shortening, and durability reduction of the fuel cell system by operating the normal stacks and the deteriorated stacks in different operation conditions by separately controlling the fuel cell stacks that are deteriorated due to the performance degradation.

DOCUMENTS OF RELATED ART (Patent Document 1) Japanese Patent Application Publication No. 2005-526363

SUMMARY OF THE INVENTION

Accordingly, the present invention has been made keeping in mind the above problems occurring in the conventional art, and an object of the present invention is to provide an apparatus for controlling a fuel cell system using a reconfigurable switch network, which has amount of switches which is linearly related with stack amount, which may minimize to spread degradation of some stacks to other normal stacks by separating fuel cell stacks in which deterioration occurs from a main power conversion system through reconfiguration of the stacks, and which may minimize the life shortening and durability reduction of the fuel cell system by operating the normal stacks and the deteriorated stacks in different operation conditions by separately controlling the fuel cell stacks that are deteriorated due to the performance degradation.

Another object of the present invention is to provide a method for controlling a fuel cell system using a reconfigurable switch network, which has amount of switches which is linearly related with stack amount, which may minimize to spread degradation of some stacks to other normal stacks by separating fuel cell stacks in which deterioration occurs from a main power conversion system through reconfiguration of the stacks, and which may minimize the life shortening and durability reduction of the fuel cell system by operating the normal stacks and the deteriorated stacks in different operation conditions by separately controlling the fuel cell stacks that are deteriorated due to the performance degradation.

In an apparatus for controlling a fuel cell system equipped with multiple hot boxes including multiple fuel cell stacks, the apparatus for controlling the fuel cell system using a reconfigurable switch network according to an embodiment of the present invention to solve the above-mentioned problem, includes: a main power conversion system for supplying outputs of normal stacks among the multiple fuel cell stacks to a load; at least one auxiliary power conversion system for supplying an output of at least one deteriorated stack among the multiple fuel cell stacks to a load; a reconfigurable switch network for connecting stacks of any hot box with stacks of another hot box in series or in parallel; and a control unit for controlling an operation of the reconfigurable switch network by detecting a state of each of the stacks.

In the apparatus for controlling a fuel cell system using a reconfigurable switch network according to an embodiment of the present invention, the reconfigurable switch network may include an upper layer reconfigurable switch network and a lower layer reconfigurable switch network; the lower layer reconfigurable switch network may include at least one connection selecting switch unit for connecting an output of each of the stacks in each of the hot boxes to a connection terminal for the main power conversion system, or to a connection terminal for the at least one auxiliary power conversion system, which is included in the hot box; and the upper layer reconfigurable switch network may include at least one connection changing switch unit for connecting in series or in parallel a connection terminal for the main power conversion system of any hot box to a connection terminal for the main power conversion system of an adjacent hot box, and for connecting in series or in parallel a connection terminal for the at least one auxiliary power conversion system of any hot box to a corresponding connection terminal for the auxiliary power conversion system of an adjacent hot box.

In the apparatus for controlling a fuel cell system using a reconfigurable switch network according to an embodiment of the present invention, the at least one connection selecting switch unit is included in the hot box, and the at least one connection changing switch unit may be disposed between adjacent hot boxes.

In the apparatus for controlling a fuel cell system using a reconfigurable switch network according to an embodiment of the present invention, the at least one auxiliary power conversion system includes first to $N^{th}$ auxiliary power conversion systems, N being an integer of 1 or more; the connection terminal for the main power conversion system includes a positive connection terminal for the main power conversion system and a negative connection terminal for the main power conversion system; the connection terminals for the first to $N^{th}$ auxiliary power conversion systems include positive connection terminals for the first to $N^{th}$ auxiliary power conversion systems and negative connection terminals for the first to $N^{th}$ auxiliary power conversion systems; and each connection selecting switch unit may include; (N+1) number of switches, for each of the fuel cell stacks, of which one end is connected to a positive voltage output terminal of the fuel cell stack and of which the other end is connected to the positive connection terminal for the main power conversion system and to the positive connection terminals for the first to $N^{th}$ auxiliary power conversion systems; and (N+1) number of switches, for each of the fuel cell stacks, of which one end is connected to a negative voltage output terminal of the fuel cell stack and of which the other end is connected to the negative connection terminal for the main power conversion system and to the negative connection terminals for the first to $N^{th}$ auxiliary power conversion systems.

In the apparatus for controlling a fuel cell system using a reconfigurable switch network according to an embodiment of the present invention, each connection changing switch unit may include: a connection changing switch unit for the main power conversion system, which connects in series or in parallel a connection terminal for the main power conversion system of any hot box to a connection terminal for the main power conversion system of an adjacent hot box; and connection changing switch units for the first to the $N^{th}$ auxiliary power conversion systems, which connect in series or in parallel connection terminals for the first to $N^{th}$ auxiliary power conversion systems of any hot box to corresponding connection terminals for the first to $N^{th}$ auxiliary power conversion systems of an adjacent hot box.

In the apparatus for controlling a fuel cell system using a reconfigurable switch network according to an embodiment of the present invention, the hot box includes first to $M^{th}$ hot boxes, M being an integer of 2 or more, and each of the connection changing switch unit for the main power conversion system may include: a first switch for the main power conversion system, of which one end is connected to any positive connection terminal for the main power conversion system and of which the other end is connected to an adjacent positive connection terminal for the main power conversion system; a second switch for the main power conversion system, of which one end is connected to the positive connection terminal for the main power conversion system and of which the other end is connected to an adjacent negative connection terminal for the main power conversion system; and a third switch for the main power conversion system, of which one end is connected to a negative connection terminal for the main power conversion system and of which the other end is connected to the adjacent negative connection terminal for the main power conversion system.

In the apparatus for controlling a fuel cell system using a reconfigurable switch network according to an embodiment of the present invention, each of the connection changing switch units for first to $N^{th}$ auxiliary power conversion systems includes: a first switch for the auxiliary power conversion system, of which one end is connected to one of the positive connection terminals for the first to $N^{th}$ auxiliary power conversion systems and of which the other end is connected to an adjacent positive connection terminal for a corresponding auxiliary power conversion system; a second switch for the auxiliary power conversion system, of which one end is connected to the positive connection terminal for the auxiliary power conversion system and of which the other end is connected to an adjacent negative connection terminal for the corresponding auxiliary power conversion system; and a third switch for the auxiliary power conversion system, of which one end is connected to a negative connection terminal for the auxiliary power conversion system and of which the other end is connected to the adjacent negative connection terminal for the corresponding auxiliary power conversion system, wherein both the negative connection terminal for the main power conversion system in the first hot box and the negative connection terminals for the first to $N^{th}$ auxiliary power conversion systems in the first hot box are connected to a ground, the positive connection terminal for the main power conversion system in the $M^{th}$ hot box is connected to the main power conversion system, and the positive connection terminals for the first to $N^{th}$ auxiliary power conversion systems in the $M^{th}$ hot box are connected to the first to $N^{th}$ auxiliary power conversion systems, respectively.

In the apparatus for controlling a fuel cell system using a reconfigurable switch network according to an embodiment of the present invention, the first switch for the main power conversion system and the third switch for the main power conversion system may operate in conjunction with each other depending on a same control signal, and the first switch for the first to $N^{th}$ auxiliary power conversion systems and the third switch for the first to $N^{th}$ auxiliary power conversion systems may operate in conjunction with each other depending on a same control signal.

In the apparatus for controlling a fuel cell system using a reconfigurable switch network according to an embodiment of the present invention, the control unit may disconnect an output of at least one deteriorated stack from the main power conversion system and may connect the output of the at least one deteriorated stack to the at least one auxiliary power conversion system by controlling an operation of the reconfigurable switch network when the at least one deteriorated stack is detected.

In the apparatus for controlling a fuel cell system using a reconfigurable switch network according to an embodiment of the present invention, the control unit may disconnect an output of at least one stack that cannot operate from the main power conversion system or from the at least one auxiliary power conversion system by controlling an operation of the reconfigurable switch network when the at least one stack that cannot operate is detected.

In the apparatus for controlling a fuel cell system using a reconfigurable switch network according to an embodiment of the present invention, the control unit may control an operation of the reconfigurable switch network to arrange normal stacks, connected to the main power conversion system, in an array of (n1×n2), may disconnect a predetermined number of normal stacks that exceed the number of the normal stacks required to configure the array, and may connect the disconnected normal stacks to the at least one auxiliary power conversion system, n1 and n2 being integers of 2 or more.

In the apparatus for controlling a fuel cell system using a reconfigurable switch network according, to an embodiment of the present invention, the at least one deteriorated stack may be connected in series, in parallel, or in series-parallel.

In the apparatus for controlling a fuel cell system using a reconfigurable switch network according to an embodiment of the present invention, the normal stacks or the deteriorated stacks may be connected in series, in parallel, or in series-parallel.

In a method for controlling a fuel cell system that includes multiple hot boxes including multiple fuel cell stacks, the method for controlling the fuel cell system using a reconfigurable switch network according to an embodiment of the present invention to solve the other problem that is mentioned above, includes: (A) determining by a control unit whether at least one deteriorated stack or a stack that cannot operate exists; (B) disconnecting an output of at least one deteriorated stack from a main power conversion system by disconnecting the at least one deteriorated stack from a connection terminal for the main power conversion system and by connecting the at least one deteriorated stack to a connection terminal for at least one auxiliary power conversion system, by controlling an operation of the reconfigurable switch network when it is determined that the at least one deteriorated stack exists; and (c) connecting the at least one deteriorated stack to the at least one auxiliary power conversion system by connecting connection terminals for the auxiliary power conversion system in series or in parallel by controlling an operation of the reconfigurable switch network.

In the method for controlling a fuel cell system using a reconfigurable switch network according to an embodiment of the present invention, the reconfigurable switch network includes an upper layer reconfigurable switch network and a lower layer reconfigurable switch network; the lower layer reconfigurable switch network may include at least one connection selecting switch unit for connecting an output of each of the stacks in each of the hot boxes to a connection terminal for the main power conversion system, or to a connection terminal for the at least one auxiliary power conversion system, which are included in the hot box; and the upper layer reconfigurable switch network may include at least one connection changing switch unit for connecting in series or in parallel a connection terminal for the main power conversion system of any hot box to a connection terminal for the main power conversion system of an adjacent hot box, and for connecting in series or in parallel a connection terminal for the a least one auxiliary power conversion system of any hot box to a corresponding connection terminal for the auxiliary power conversion system of an adjacent hot box.

In the method for controlling a fuel cell system using a reconfigurable switch network according to an embodiment of the present invention, the at least one connection selecting switch unit is included in the hot box, and the at least one connection changing switch unit may be disposed between adjacent hot boxes.

In the method for controlling a fuel cell system using a reconfigurable switch network according to an embodiment of the present invention, the at least one auxiliary power conversion system includes first to $N^{th}$ auxiliary power conversion systems, N being an integer of 1 or more; the connection terminal for the main power conversion system includes a positive connection terminal for the main power conversion system and a negative connection terminal for the main power conversion system; the connection terminals for the first to $N^{th}$ auxiliary power conversion systems include positive connection terminals for the first to $N^{th}$ auxiliary power conversion systems and negative connection terminals for the first to $N^{th}$ auxiliary power conversion systems; and each connection selecting switch unit includes: (N+1) number of switches, for each of the fuel cell stacks, of which one end is connected to a positive voltage output terminal of the fuel cell stack and of which the other end is connected to the positive connection terminal to the main power conversion system and to the positive connection terminals for the first to $N^{th}$ auxiliary power conversion systems; and (N+1) number of switches, for each of the fuel cell stacks, of which one end is connected to a negative voltage output terminal of the fuel cell stack and of which the other end is connected to the negative connection terminal for the main power conversion system and to the negative connection terminals for the first to $N^{th}$ auxiliary power conversion systems.

In the method for controlling a fuel cell system using a reconfigurable switch network according to an embodiment of the present invention, the hot box includes first to $M^{th}$ hot boxes, M being an integer of 2 or more, and each of the connection changing switch unit for the main power conversion system includes: a first switch for the main power conversion system, of which one end is connected to any positive connection terminal for the main power conversion system and of which the other end is connected to an adjacent positive connection terminal for the main power conversion system; a second switch for the main power conversion system, of which one end is connected to the positive connection terminal for the main power conversion system and of which the other end is connected to an adjacent negative connection terminal for the main power conversion system; and a third switch for the main power conversion system, of which one end is connected to a negative connection terminal for the main power conversion system and of which the other end is connected to the adjacent negative connection terminal for the main power conversion system.

The method for controlling a fuel cell system using a reconfigurable switch network according to an embodiment of the present invention, may further include disconnecting an output of at least one stack that cannot operate from the main power conversion system or from the at least one auxiliary power conversion system after the step (A) when it is determined that the at least one stack that cannot operate is detected in the step (A).

The method for controlling a fuel cell system using a reconfigurable switch network according to an embodiment of the present invention, may further include disconnecting by the control unit, a predetermined number of normal stacks that exceed the number of normal stacks required to configure an array of (n1×n2) from the main power conversion system and connecting by the control unit, the disconnected normal stacks to the auxiliary power conversion system, to arrange the normal stacks that are connected to the main power conversion system in the array of (n1×n2) by controlling an operation of the reconfigurable switch network after the step (B) or (C), n1 and n2 being integers of 2 or more.

The above and other objects, features and advantages of the present invention will be more clearly understood from the following detailed description when taken in conjunction with the accompanying drawings.

All terms or words used in the specification and claims have the same meaning as commonly understood by one of ordinary skill in the art to which in concepts belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

According to an embodiment of the present invention, it is possible to minimize to spread degradation of some stacks to other normal stacks by separating fuel cell stacks in which deterioration occurs from a main power conversion system through reconfiguration of stacks, with linear switch network complexity. Also, the life shortening and durability reduction of the fuel cell system may be minimized by operating the normal stacks and the deteriorated stacks in different operation conditions by separately controlling the fuel cell stacks that are deteriorated due to the performance degradation. Also, the stacks that cannot operate are separated from the main power conversion system and from an auxiliary power conversion system, whereby the life shortening and durability reduction of the whole fuel cell system may be minimized.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

The above and other objects, features and other advantages of the present invention will be more clearly understood from the following detailed description when taken in conjunction with the accompanying drawings.

As for reference numerals associated with parts in the drawings, the same reference numerals will refer to the same or like parts through the drawings.

It will be understood that, although the terms "one end," "the other end," "first," "second," etc. may be used herein to describe various elements, these elements should not be limited by these terms. These terms are only used to distinguish one element from another element.

Hereinbelow, in the description, details of well-known features and techniques may be omitted to avoid unnecessarily obscuring the presented embodiments.

Hereinbelow, exemplary embodiments of the present invention will be described in detail with reference to the accompanying drawings.

Figure 1:
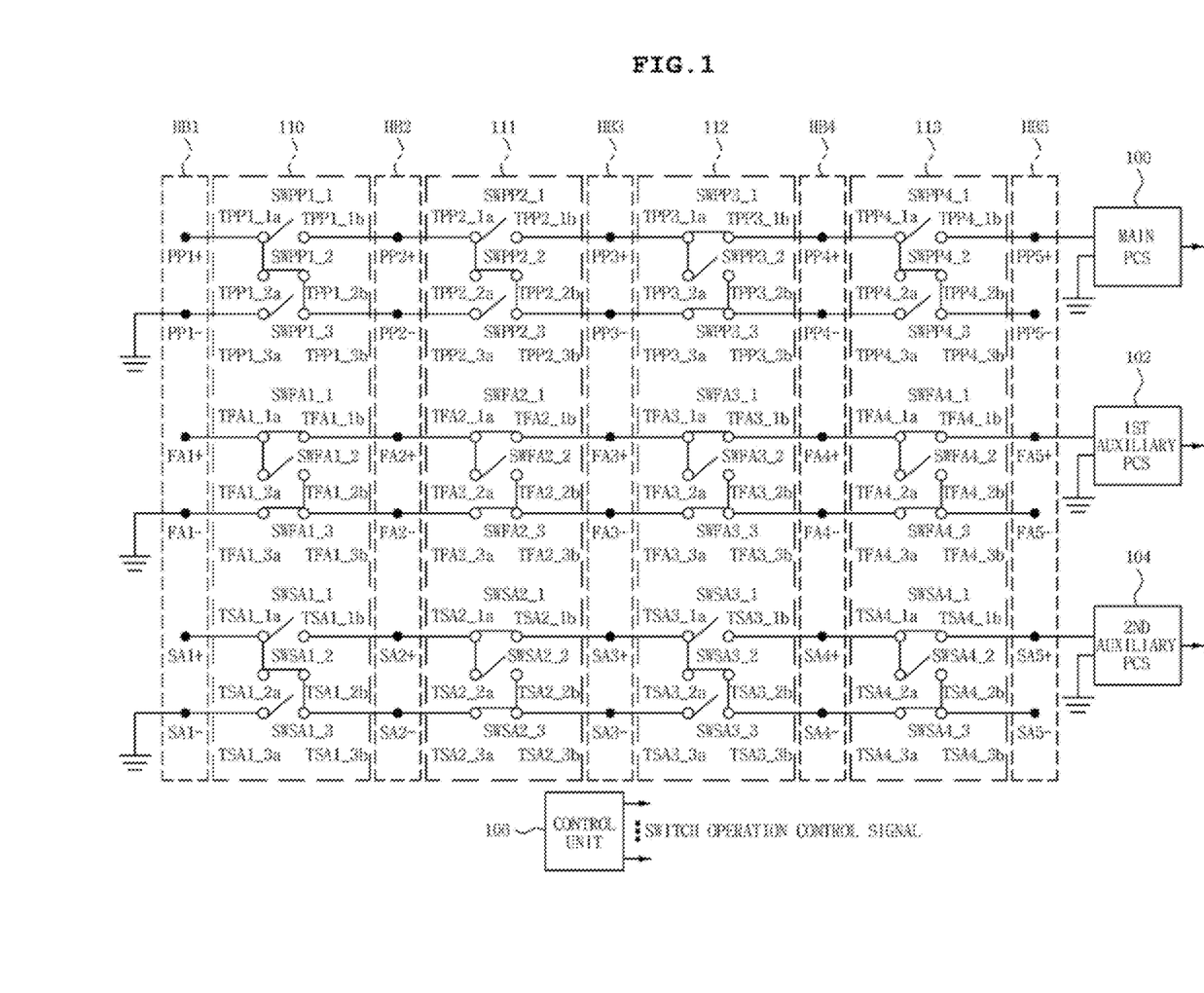
FIG. 1 is a view illustrating an apparatus for controlling a fuel cell system using a reconfigurable switch network according to an embodiment of the present invention.
Figure 2:
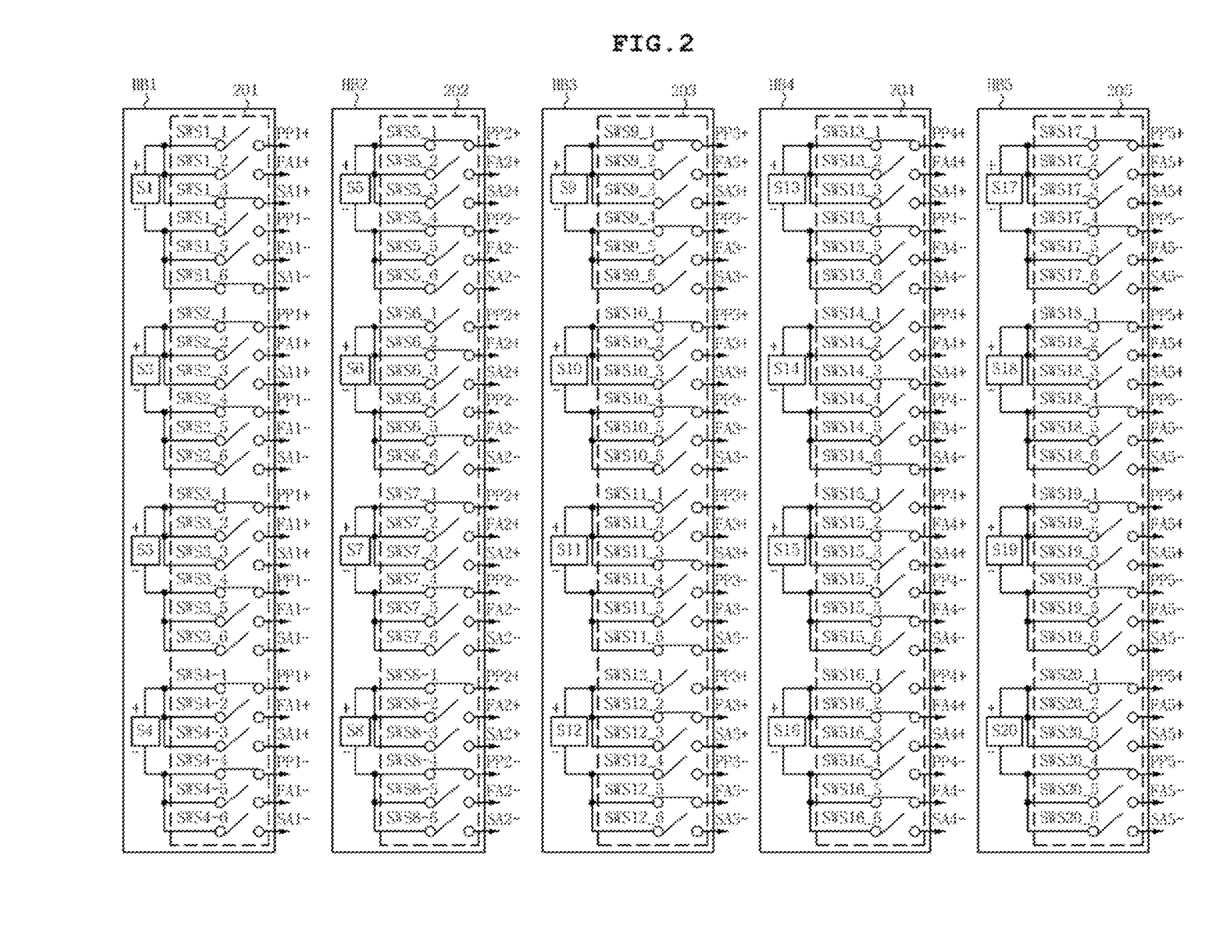
FIG. 2 is a view illustrating a connection of stacks in each hot box in an apparatus for controlling a fuel cell system using a reconfigurable switch network according to an embodiment of the present invention.

FIG. 1 is a view illustrating an apparatus for controlling a fuel cell system using a reconfigurable switch network according to an embodiment of the present invention, and FIG. 2 is a view illustrating a connection of stacks in each hot box in an apparatus for controlling a fuel cell system using a reconfigurable switch network according to an embodiment of the present invention.

Hereinafter, referring to FIGS. 1 and 2 an apparatus for controlling a fuel cell system using a reconfigurable switch network according to an embodiment of the present invention will be described.

For a fuel cell system including a first hot box HB1 to a fifth hot box HB5 in which four fuel cell stacks among twenty fuel cell stacks S1 to S20 are contained, an apparatus for controlling the fuel cell system using a reconfigurable switch network according to an embodiment of the present invention illustrated in FIGS. 1 and 2 includes: a main power conversion system 100 for supplying outputs of normal stacks among the twenty fuel cell stacks S1 to S20 to a load; a first and a second auxiliary power conversion system 102 and 104 for supplying an output of at least one deteriorated stack among the twenty fuel cell stacks to a load; a reconfigurable switch network 110 to 113 and 201 to 205 for connecting stacks of any hot box to stacks of another hot box in series or in parallel; and a control unit 106 for controlling an operation of the reconfigurable switch network by detecting a state of each of the fuel cell stacks S1 to S20.

The reconfigurable switch network 110 to 113 and 201 to 205 includes an upper layer reconfigurable switch network 110 to 113 and a lower layer reconfigurable switch network 201 to 205.

The lower layer reconfigurable switch network 201 to 205 includes first to fifth connection selecting switch units 201 to 205 for connecting the output of the each of the stacks S1 to S20 of the first hot box HB1 to the fifth hot box HB5 with connection terminals for the main power conversion system PP1+ to PP5+ and PP1− to PP5−, or with connection terminals for the auxiliary power conversion systems FA1+ to FA5+, FA1− to FA5−, SA1+ to SA5+, and SA1− to SA5−.

The upper layer reconfigurable switch network 110 to 113 includes first to fourth connection changing switch units 110 to 113 for connecting in series or in parallel the connection terminals for the main power conversion system PP1+ to PP5+ and PP1− to PP5− of any hot box among the first hot box HB1 to the fifth hot box HB5 with the connection terminals for the main power conversion system PP1+ to PP5+ and PP1− to PP5− of an adjacent hot box, and for connecting in series or in parallel the connection terminals for the auxiliary power conversion systems FA1+ to FA5+, FA1− to FA5−, SA1+ to SA5+, and SA1− to SA5− of any hot box with the corresponding connection terminals for the auxiliary power conversion system FA1+ to FA5+, FA1− to FA5−, SA1+ to SA5+, and SA1− to SA5− of an adjacent hot box.

The first to fifth connection selecting switch units 201 to 205 are included in the hot boxes HB1 to HB5, and the first to fourth connection changing switch units 110 to 113 are disposed between the adjacent hot boxes.

The connection terminals for the main power conversion system PP1+ to PP5+ and PP1− to PP5− include positive connection terminals for the main power conversion system PP1+ to PP5+ and negative connection terminal for the main power conversion system PP1− to pp5−. The connection terminals for the first and second auxiliary power conversion systems FA1+ to FA5+, FA1− to FA5−, SA1+ to SA5+, and SA1− to SA5− include positive connection terminals for the first and second auxiliary power conversion systems FA1+ to FA5+ and SA1+ to SA5+, and negative connection terminals for the first and second auxiliary power conversion systems FA1− to FA5− and SA1− to SA5−.

Each of the first to fifth connection selecting switch units 201 to 205 includes multiple switches. Six switches are arranged for each of the fuel cell stack S1 to S20.

For example, the first connection selecting switch unit 201 includes twenty four switches in such a way that six switches are disposed in each of the stack S1 to S4.

In other words, six switches SWS1_1 to SWS1_6, six switches SWS2_1 to SWS2_6, six switches SWS3_1 to SWS3_6 and six switches SWS4_1 to SWS4_6 are disposal in the first stack S1, the second stack S2, the third stack S3, and the fourth stack S4, respectively.

Among the six switches SWS1_1 to SWS1_6 disposed in the first stack S1, one end of each of the three switches SWS1_1 to SWS1_3 is connected to a positive voltage output terminal (+) of the first stack S1, and the other end of the three switches SWS1_1 to SWS1_3 is respectively connected to a positive connection terminal for the main power conversion system PP1+, a positive connection terminal for the first auxiliary power conversion system FA1+, and a positive connection terminal for the second auxiliary power conversion system SA1+.

Among the six switches SWS1_1 to SWS1_6 disposed in the first stack S1, one end of each of the remaining three switches SWS1_4 to SWS1_6 is connected to a negative voltage output terminal (−) of the first stack S1, and the other end of the three switches SWS1_4 to SWS1_6 is respectively connected to a negative connection terminal for the main power conversion system PP1−, a negative connection terminal for the first auxiliary power conversion system FA1−, and a negative connection terminal for the second auxiliary power conversion system SA1−.

As the switches disposed in the wicks including the second stack S2 to the fourth stack S4 have the same configuration as the switches disposed in the first stack S1, a description is omitted.

Also, as configurations of the second connection selecting switch unit 202 to the fifth connection selecting switch unit 205 are the same as the configuration of the first connection selecting switch unit 201, a description is omitted.

The first connection changing switch unit 110 includes multiple switches in such a way that three switches are respectively arranged for connection terminals for the main power conversion system PP1+ and PP1− of the first hot box HB1, for connection terminals for the first auxiliary power conversion system FA1+ and FA1− of the first hot box HB1, and for the connection terminals for the second auxiliary power conversion system SA1+ and SA1− of the first hot box HB1.

First to third switches for the main power conversion system SWPP1_1 to SWPP1_3 are disposed in the connection terminals for the main power conversion system PP1+ and PP1− of the first hot box HB1. First to third switches for the first auxiliary power conversion system SWFA1_1 to SWFA1_3 are disposed in the connection terminals for the first auxiliary power conversion system FA1+ and FA1−. Also, first to third switches for the second auxiliary power conversion system SWSA1_1 SWSA1_3 are disposed in the connection terminals for the second auxiliary power conversion system SA1+ and SA1−.

One end TPP1_1a of the first switch for the main power conversion system SWPP1_1 is connected to the positive connection terminal for the main power conversion system PP1+ of the first hot box HB1, and the other end TPP1_1b is connected to the positive connection terminal for the main power conversion system PP2+ of the adjacent second hot box HB2.

One end TPP1_2a of the second switch for the main power conversion system SWPP1_2 is connected to the positive connection terminal for the main power conversion system PP1+ of the first hot box HB1, and the other end TPP1_2b is connected to the negative connection terminal for the main power conversion system PP2− of the adjacent second hot box HB2.

One end TPP1_3a of the third switch for the main power conversion system SWPP1_3 is connected to the negative connection terminal for the main power conversion system PP1− of the first hot box HB1, and the other end TPP1_3b is connected to the negative connection terminal for the main power conversion system PP2− of the adjacent second hot box HB2.

One end TFA1_1a of the first switch for the first auxiliary power conversion system SWFA1_1 is connected to the positive connection terminal for the first auxiliary power conversion system FA1+ of the first hot box HB1, and the other end TFA1_ 1b is connected to the positive connection terminal for the first auxiliary power conversion system FA2+ of the adjacent second hot box HB2.

One end TFA1_2a of the second switch for the first auxiliary power conversion system SWFA1_2 is connected to the positive connection terminal for the first auxiliary power conversion system FA1+ of the first hot box HB1, and the other end TFA1_2b is connected to the negative connection terminal for the first auxiliary power conversion system FA2− of the adjacent second hot box HB2.

One end TFA1_3a of the third switch for the first auxiliary power conversion system SWFA1_3 is connected to the negative connection terminal for the first auxiliary power conversion system FA1− of the first hot box HB1, and the other end TFA1_3b is connected to the negative connection terminal for the first auxiliary power conversion system FA2− of the adjacent second hot box HB2.

One end TSA1_1a to of the first switch for the second auxiliary power conversion system SWSA1_1 is connected to the positive connection terminal for the second auxiliary power conversion system SA1− of the first hot box HB1, and the other end TSA1_1b is connected to the positive connection terminal for the second auxiliary power conversion system SA2− of the adjacent second hot box HB2.

One end TSA1_2a of the second switch for the second auxiliary power conversion system SWSA1_2 is connected to the positive connection terminal for the second auxiliary power conversion system SA1+ of the first hot box HB1, and the other end TSA1_2b is connected to the negative connection terminal for the second auxiliary power conversion system SA2− of the adjacent second hot box HB2.

One end TSA1_3a of the third switch for the second auxiliary power conversion system SWSA1_3 is connected to the negative connection terminal for the second auxiliary power conversion system SA1− of the first hot box HB1, and the other end TSA1_3b is connected to a negative connection terminal for the second auxiliary power conversion system SA2− of the adjacent second hot box HB2.

The first switch for the main power conversion system SWPP1_1 and the third switch for the main power conversion system SWPP_3 operate in conjunction with each other according to the same control signal. The first switch for the first auxiliary power conversion system SWFA1_1 and the third switch for the first auxiliary power conversion system SWFA1_3 operate in conjunction with each other according to the same control signal. Also, the first switch for the second auxiliary power conversion system SWSA1_1 and the third switch for the second auxiliary power conversion system SWSA1_3 operate in conjunction with each other according to the same control signal.

As the first to fourth connection changing switch units 110 to 113 have the same configuration, a description about the configurations of the second to fourth connection changing switch units 111 to 113 is omitted.

Both the negative connection terminal for the main power conversion system PP1− and the negative connection terminals for the first and second auxiliary power conversion systems FA1− and SA1− in the first hot box HB1 are connected to a ground.

The positive connection terminal for the main power conversion system PP5+ in the fifth hot box HB5 is connected to the main power conversion system 100, and the positive connection terminals for the first and second auxiliary power conversion systems FA5+ and SA5+ in the fifth hot box HB5 are connected to the first and second power conversion systems 102 and 104, respectively.

The control unit 106 generates switch operation control signals to control operations of all the switches illustrated in FIGS. 1 and 2.

In the apparatus for controlling a fuel cell system using a reconfigurable switch network according to an embodiment of the present invention, each of the first to fifth hot boxes HB1 to HB5 includes four fuel cell stacks. However, the number of stacks in the hot box is not limited. A configuration of each of the hot boxes is determined by considering various conditions such as an electrochemical characteristic of the fuel cell, Balance of Plant (BOP), and the like.

An apparatus for controlling a fuel cell system using a reconfigurable switch network according to an embodiment of the present invention may improve stability of the stacks by using a reconfigurable layered switch network, and the system may be configured to have linear switch network complexity even though the number of the stacks is increased.

The upper layer reconfigurable switch network 110 to 113 illustrated in FIG. 1 operates to freely change a structure between the hot boxes including the first to fifth hot boxes HB1 to HB5 to a series, a parallel, or a series-parallel structure. The lower layer reconfigurable switch network 201 to 205 illustrated in FIG. 2 operates to select a connection target of an output of the fuel cell stack in the first to fifth hot boxes HB1 to HB5. Consequently, the lower layer reconfigurable switch network in each hot box operates to selectively connect fuel cell stacks in parallel in each hot box and connect the stacks to the main power conversion system or to the auxiliary power conversion system.

In other words, the upper layer reconfigurable switch network 110 to 113 selectively connects in series or in parallel the positive connection terminals for the main power conversion system PP1+ to PP5+ and the negative connection terminals for the main power conversion system PP1− to PP5−; selectively connects in series or in parallel the positive connection terminals for the first auxiliary power conversion system FA1+ to FA5+ and the negative connection terminals for the first auxiliary power conversion system FA1− to FA5−; and selectively connects in series or in parallel the positive connection terminal for the second auxiliary power conversion system SA1+ to SA5+ and the negative connection terminals for the second auxiliary power conversion system SA1− to SA5−.

Using the upper layer reconfigurable switch network 110 to 113 and the lower layer reconfigurable switch network 201 to 205, all of the stacks S1 to S20 in the first to fifth hot boxes HB1 to HB5 may be individually and freely connected to the main power conversion system 100, to the first auxiliary power conversion system 102, or to the second auxiliary power conversion system 104.

For example, a normal stack is connected to the main power conversion system 100, and abnormal stacks such as deteriorated stacks are connected to the first auxiliary power conversion system 104, whereby it is possible to prevent acceleration of the deterioration that can be caused by connecting the normal stack with the abnormal stacks.

An apparatus for controlling a fuel cell system using a reconfigurable switch network according to an embodiment of the present invention illustrated in FIG. 1 includes a main power conversion system 100 and two auxiliary power conversion systems 102 and 104, but not limited to this, the number of the auxiliary power conversion systems may be increased to delicately control the deterioration. The complexity of the upper layer switch network 110 to 113 equals the number of power conversion systems×(the number of hot boxes−1)×3, and thus the complexity linearly increases as the number of the power conversion systems and the number of the hot boxes increase. Consequently, though the number of the stacks increases, the complexity of the whole system does not greatly increase.

For the clarity and convenience of the description, stacks are not illustrated in the first hot box HB1 to fifth hot box HB5 in FIG. 1. However, the stacks and switches illustrated in FIG. 2 are actually disposed in each of the hot boxes HB1 to HB5.

For example, besides the connection terminals for the main power conversion system PP1+ and PP1− and the connection terminals for the auxiliary power conversion systems FA1+, FA1−, SA1+, and SA1−, the first hot box HB1 timber includes the first stack S1 to the fourth stack S4 and the first connection selecting switch unit 201.

The second hot box HB2 to the fifth hot box HB5 has the same configuration as the first hot box HB1.

On the other hand, the number of switches of the lower layer switch network 201 to 205 is determined as (the number of stacks in the hot box×the number of power conversion systems×2), and the connection in the hot box has the complexity that is linearly proportional to the number of the stacks. Consequently, though the number of the stacks increases, the complexity of the whole system only linearly increases and thus does not greatly increase.

An operation of the above-described apparatus for controlling a fuel cell system using a reconfigurable switch network according to an embodiment of the present invention will be described below.

Initial Operation of the Apparatus for Controlling a Fuel Cell System Using a Reconfigurable Switch Network At the beginning of the operation, the apparatus for controlling a fuel cell system using a reconfigurable switch network according to an embodiment of the present invention, illustrated in FIGS. 1 and 2, connects all of the stacks including the first stack S1 to the twentieth stack S20, which are included in the first hot box HB1 to the fifth hot box HB5, to the main power conversion system 100.

For reference, the reconfigurable switch network according to an embodiment of the present invention illustrated in FIGS. 1 and 2 indicates states of the switches when a deteriorated stack exists. The states of the switches when all the stacks S1 to S20 are connected to the main power conversion system 100 at the beginning of the operation is replaced with the following description, not illustrated in the drawings.

To connect all of the stacks including the first stack S1 to the twentieth stack S20 to the main power conversion system 100, the control unit 106 controls the operation of the switches illustrated in FIGS. 1 and 2 by outputting switch operation control signals.

First, the control unit 106 connects the stacks including the first to twentieth stacks S1 to S20 to the connection terminals for the main power conversion system PP1+ to PP5+ and PP1− to PP5−, which are connection targets, by controlling the operation of the first to fifth connection selecting switch units 201 to 205, which is the lower layer reconfigurable switch network.

For example, the control unit 106 connects a positive voltage output terminal (+) of the first stack S1 to the positive connection terminal for the main power conversion system PP1+ by turning on (shorting) the first switch SWS1_1 in the first connection selecting switch unit 201, and connects a negative voltage output terminal (−) of the first stack S1 to the negative connection terminal for the main power conversion system PP1− by turning on (shorting) the fourth switch SWS1_4.

On the other hand, the control unit 106 turns off (opens) the second switch SWS1_2, the third switch SWS1_3, the fifth switch SWS1_5, and the sixth switch SWS1_6 in the first connection selecting switch unit 201.

For the second stack S2 to the twentieth stack S20, the positive voltage output terminals of the stacks, including the second stack S2 to twentieth stack S20, are connected to the positive connection terminals for the main power conversion system PP2+ to PP5+, and the negative voltage output terminals of the stacks, including the second stack S2 to twentieth stack S20, are connected to the negative connection terminals for the main power conversion system PP2− to PP5− by controlling the operation of the switches in the first to fifth connection selecting switch units 201 to 205.

Subsequently, to satisfy the output current and voltage characteristic required by the main power conversion system 100, the control unit 106 reconfigures the positive connection terminals for the main power conversion system PP1+ to PP5+ and the negative connection terminals for the main power conversion system PP1+ to PP5− in series, in parallel, or in series-parallel by controlling the operation of the first to fourth connection changing switch units 110 to 113, which are the upper layer reconfigurable switch network.

As described above, when the control unit 106 controls the first to fifth connection selecting switch units 201 to 205 which are the lower layer reconfigurable switch network, and the first to fourth connection changing switch units 110 to 113, which are the upper layer reconfigurable switch network, the outputs of the stacks including the first stack S1 to the twentieth stack S20 are connected to the main power conversion system 100, thus the outputs of the stacks including the first stack S1 to twentieth stack S20 are supplied to the main power conversion system 100.

Operation when a Deteriorated Stack Exists

Figure 3:
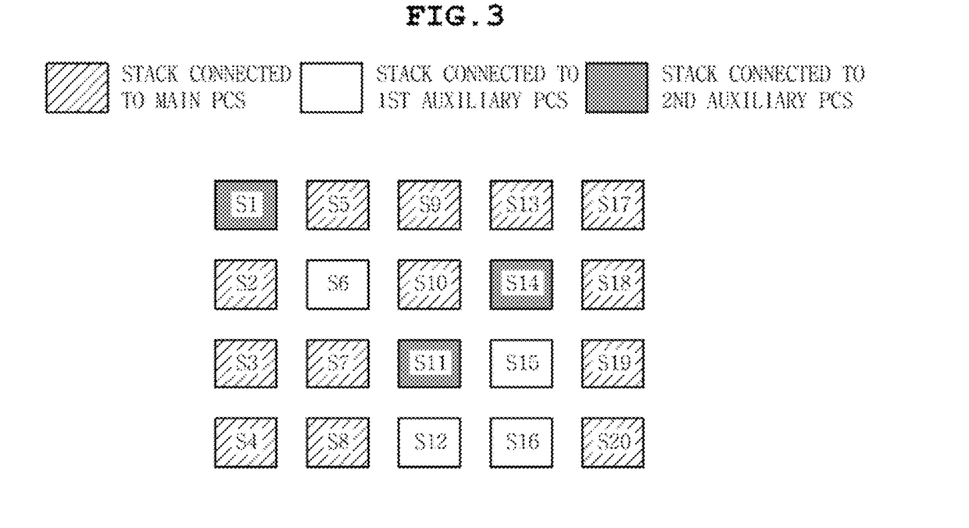
FIG. 3 is a view illustrating a physical layout of stacks.

FIG. 3 is a view illustrating a physical layout of the first stack S1 to the twentieth stack S20. The sixth stack S6, the twelfth stack S12, the fifteenth stack S15, and the sixteenth stack S16 are stacks deteriorated below a first standard. The first stack S1, the eleventh stack S11, and the fourteenth stack S14 are stacks deteriorated below a second standard. It is assumed that the stacks deteriorated below the second standard are more deteriorated stacks than the stacks deteriorated below the first standard.

Figure 4A:
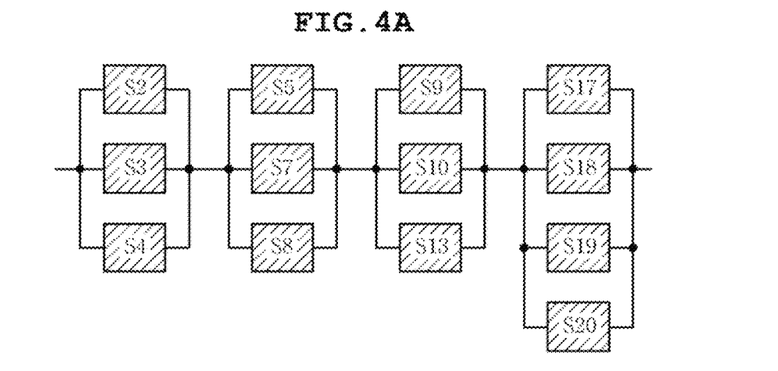
FIG. 4a is a view illustrating a logical layout of normal stacks.
Figure 4B:
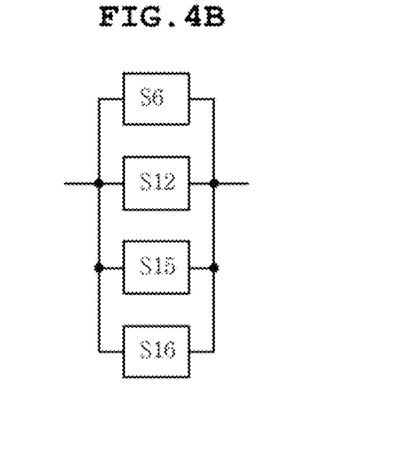
FIG. 4b is a view illustrating a logical layout of deteriorated stacks.
Figure 4C:
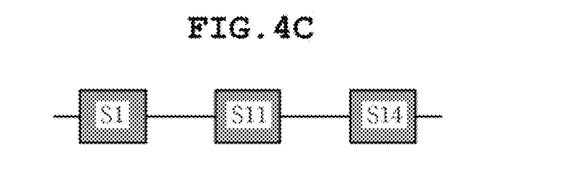
FIG. 4c is a view illustrating a logical layout of the other deteriorated stacks.

Based on the current flowing in the first stack S1 to twentieth stack S20, or based on the output voltage of the stacks, the control unit 106 determines whether a deteriorated stack having degraded performance exists, and reconfigures the stacks as illustrated in FIGS. 4a to 4c depending on the deterioration states of the stacks.

FIGS. 4a to 4c are views illustrating a logical layout of the stacks. FIG. 4a illustrates a logical layout of the normal stacks; FIG. 4b illustrates a logical layout of the stacks deteriorated below the first standard; and FIG. 4c illustrates a logical layout of the stacks deteriorated below the second standard.

When a deteriorate stack is detected, the control unit 106 logically reconfigures the normal stacks and the deteriorated stacks according to the logical layouts illustrated in FIGS. 4a to 4c. In other words, the control unit 106 connects the normal stacks S2, S3, S4, S5, S7, S8, S9, S10, S13, S17, S18, S19, and S20 illustrated in FIG. 4a to the main power conversion system 100; connects the stacks deteriorated below the first standard S6, S12, S15, and S16 illustrated in FIG. 4b to the first auxiliary power conversion system 102; and connects the stacks deteriorated below the second standard S1, S11, and S14 illustrated in FIG. 4c to the second auxiliary power conversion system 104.

Hereinafter, it is specifically described how the control unit 106 operates to reconfigure the stacks according to the logical layouts illustrated in FIGS. 4a to 4c when the deteriorated stack is detected.

First, the operation for reconfiguring the stacks deteriorated below the first standard according to the layout illustrated in FIG. 4b is described.

The control unit 106 disconnects the deteriorated stacks including the sixth stack S6, the twelfth stack S12, the fifteenth stack S15, and the sixteenth stack S16 from the main power conversion system 100, and connects the deteriorated stacks to the first auxiliary power conversion system 102.

For example, as illustrated in FIG. 2, the control unit 106 connects the sixth stack S6 to the connection terminal for the first auxiliary power conversion system FA2+ and FA2−, which are the connection targets, by controlling the operation of the second connection selecting switch unit 202 that is the lower layer reconfigurable switch network in the second hot box HB2 including the sixth stack S6.

Specifically describing the operation, the control unit 106 disconnects the sixth stack S6 from the main power conversion system 100 by turning off (opening) the switches SWS6_1, SWS6_3, SWS6_4, and SWS6_6 in the second connection selecting switch unit 202.

Subsequently, the control unit 106 connects the positive voltage output terminal (+) of the sixth stack S6 to the positive connection terminal for the first auxiliary power conversion system FA2+ by turning on (shorting) the switch SWS6_2 in the second connection selecting switch unit 202, and connects the negative voltage output terminal (−) of the sixth stack S6 to the negative connection terminal for the first auxiliary power conversion system FA2− by taming on (shorting) the switch SWS6_5.

Using the same method as the above description, the control unit 106 connects the positive voltage output terminals (+) and the negative voltage output terminals (−) of the stacks deteriorated below the first standard, including the twelfth stack S12, the fifteenth stack S15, and the sixteenth stack S16, to the positive connection terminals for the first auxiliary power conversion system FA3+, FA4+, and FA4+ and the negative connection terminals for the first auxiliary power conversion system FA3−, FA4−, and FA4−, respectively.

Subsequently, the control unit 106 connects the sixth stack S6, the twelfth stack S12, the fifteenth stack S15, and the sixteenth stack S16, which are the stacks deteriorated below the first standard, in parallel by controlling the operation of the second connection changing switch unit 111 and the operation of the third connection changing switch unit 112. Also, the control unit 106 connects the outputs of the sixth stack S6, the twelfth stack S12, the fifteenth stack S15, and the sixteenth stack S16, which are connected in parallel, to the first auxiliary power conversion system 102 by controlling the operation of the fourth connection changing switch unit 113.

Specifically describing the operation, the control unit 106 turns on (shorts) the switches SWFA2_1 and SWFA2_3 and turns off the switch SWFA2_2 in the second connection changing switch unit 111; turns on (shorts) the switches SWFA3_1 and SWFA3_3 and turns off the switch SWFA3_2 in the third connection changing switch unit 112; turns on (shorts) the switches SWFA1_1 and SWFA1_3 and turns off the switch SWFA1_2 in the first connection changing switch unit 110; and turns on (shorts) the switches SWFA4_1 and SWFA4_3 and turns off the switch SWFA4_2 in the fourth connection changing switch unit 113.

By the above-mentioned operation, the outputs of the deteriorated stacks including the sixth stack S6, the twelfth stack S12, the fifteenth stack S15, and the sixteenth stack S16, which are connected in parallel, are connected to the first auxiliary power conversion system 102.

Subsequently, the operation for reconfiguring the normal stacks according to the logical layout illustrated in FIG. 4a is described.

The control unit 106 reconfigures the normal stacks including the second stack S2 to the fifth stack S5, the seventh stack S7 to the tenth stack S10, the thirteenth stack S13, and the seventeenth stack S17 to the twentieth stack S20, and then connects the normal stacks to the main power conversion system 100.

First, as illustrated in FIG. 2, the control unit 106 connects the second stack S2 to the fourth stack S4, to the connection terminals for the main power conversion system PP1+ and PP1−, which are the connection targets, by controlling the operation of the first connection selecting unit 201 that is the lower layer reconfigurable switch network in the first hot box HB1.

Specifically describing the operation, by turning on (shorting) the switches SWS2_1, SWS2_4, SW3_1, SW3_4, SW4_1, and SW4_4 in the first connection selecting switch unit 201, the control unit 106 connects the positive voltage output terminal (+) of each of the second stack S2 to the fourth stack S4 to the positive connection terminal for the main power conversion system PP1+ and connects the negative voltage output terminal (−) of each of the second stack S2 to the fourth stack S4 to the negative connection terminal for the main power conversion system PP1−.

Using the same method as the above-mentioned method, the control unit 106 connects the positive voltage output terminals of the remaining normal stacks, including the fifth stack S5, the seventh stack S7 to the tenth stack S10, the thirteenth stack S13, and the seventeenth stack S17 to the twentieth stack S20, to the corresponding positive connection terminals for the main power conversion system PP2+ to PP5+, and connects the negative voltage output terminals of the remaining normal stacks to the corresponding negative connection terminals for the main power conversion system PP2− to PP5−.

Subsequently, the control unit 106 logically arranges the normal stacks S2, S3, S4, S5, S7, S8, S9, S10, S13, S17, S18, S19, and S20 as shown in FIG. 4a to be connected to the main power conversion system 100 by controlling the operation of the first to fourth connection changing switch units 110 to 113, which are the upper layer switch network illustrated in FIG. 1.

Specifically, first, the control unit 106 connects the ninth stack S9, the tenth stack S10, and the thirteenth stack S13 in parallel by turning on (shorting) the switches SWPP3_1 and SWPP3_3 and by turning off (opening) the switch SWPP3_2 in the third connection changing switch unit 112.

Next, the control unit 106 turns of (opens) the switches SWPP1_1 and SWPP1_3 and turns on (shorts) the switch SWPP1_2 in the first connection changing switch unit 110; turns off (opens) the switches SWPP2_1 and SWPP2_3 and turns on (shorts) the switch SWPP2_2 in the second connection changing switch unit 111; and turns off (opens) the switches SWPP4_1 and SWPP4_3 and turns on (shorts) the switch SWPP4_2, whereby the control unit 106 logically arranges the normal stacks S2, S3, S4, S5, S7, S8, S9, S10, S13, S17, S18, S19, and S20 as shown in FIG. 4a to be connected to the main power conversion system 100.

Hereinafter, the operation for reconfiguring the stacks, deteriorated below the second standard, according to the logical layout illustrated in FIG. 4c is described.

The control unit 106 disconnects the stacks deteriorated below the second standard, including the first stack S1, the eleventh stack S11, and the fourteenth stack S14, from the main power conversion system 100, and connects the stacks to the second auxiliary power conversion system 104.

Specifically describing the operation, as shown in FIG. 2, the control unit 106 connects the first stack S1 to the connection terminals for the second auxiliary power conversion system SA1+ and SA1−, which are the connection targets, by controlling the operation of the first connection selecting switch unit 201 that is the lower layer reconfigurable switch network in the first hot box HB1 including the first stack S1.

First, the control unit 106 disconnects the first stack S1 from the main power conversion system 100 by turning off (opening) the switches SWS1_1, SWS1_2, SWS1_4, and SWS1_5 in the first connection selecting switch unit 201.

Next, the control unit 106 connects the positive voltage output terminal (+) of the first stack S1 to the positive connection terminal for the second auxiliary power conversion system SA1+ by turning on (shorting) the switch SWS1_3 in the first connection selecting switch unit 201, and connects the negative voltage output terminal (−) of the first stack S1 to the negative connection terminal for the second auxiliary power conversion system SA1− by turning on (shorting) the switch SWS1_6.

Using the same method as the above-mentioned method, the control unit 106 disconnects the positive voltage output terminal and the negative voltage output terminal of the eleventh stack S11, which is another stack deteriorated below the second standard, from the positive connection terminal for the main power conversion system PP3+ and from the negative connection terminal for the main power conversion system PP3−, respectively, and connects the positive voltage output terminal and the negative voltage output terminal to the positive connection terminal for the second auxiliary power conversion system SA3+ and to the negative connection terminal for the second auxiliary power conversion system SA3−, respectively.

Similarly, the control unit 106 disconnects the positive voltage output terminal and negative voltage output terminal of the fourteenth stack S14, which is the other stack deteriorated below the second standard, from the positive connection terminal for the main power conversion system PP4+ and from the negative connection terminal for the main power conversion system PP4−, respectively, and connects the positive voltage output terminal and negative voltage output terminal to the positive connection terminal for the second auxiliary power conversion system SA4+ and to the negative connection terminal for the second auxiliary power conversion system SA4−, respectively.

Subsequently, the control unit 106 logically connects the first stack S1, the eleventh stack S11, and the fourteenth stack S14, which are the stacks deteriorated below the second standard, in series as illustrated in FIG. 4c to be connected to the second auxiliary power conversion system 104 by controlling the operation of the first to fourth connection changing switch units 110 to 113, which are the upper layer switch network illustrated in FIG. 1.

Specifically describing the operation, the control unit 106 turns off (opens) the switches SWSA1_1 and SWSA1_3 and turns on (shorts) the switch SWSA1_2 in the first connection changing switch unit 110; turns on (shorts) the switches SWSA2_1 and SWSA2_3 and turns off (opens) the switch SWSA2_2 in the second connection changing switch unit 111; turns off (opens) the switches SWSA3_1 and SWSA3_3 and turns on (shorts) the switch SWSA3_2 in the third connection changing switch unit 112; and turns on (shorts) the switches SWSA4_1 and SWSA4_3 and turns off (opens) the switch SWSA4_2 in the fourth connection changing switch unit 113.

By the above-mentioned operation, the first stack S1, the eleventh stack S11, and the fourteenth stack S14, which are the stacks deteriorated below the second standard, are logically connected in series as shown in FIG. 4c to be connected to the second auxiliary power conversion system 104.

On the other hand, to maintain the optimum efficiency of the power conversion system, voltage above a predetermined value should be input. Therefore, the stacks connected to the main power conversion system 100 should be connected in series with a predetermined size. For example, assuming that there are thirteen normal stacks, an array structure of 3×4 may be created by selecting twelve stacks to be connected to the main power conversion system 100, and it is desirable to connect one remaining normal stack to the additional auxiliary power conversion system. Also, it is desirable to disconnect malfunctioning stacks that cannot operate from the power conversion system.

In FIG. 4a, three normal stacks are connected in parallel in each column of the array, but at the far right side, four normal stacks S17 to S20 are connected in parallel. As shown in FIG. 4a, when the number of stacks connected in parallel is not the same, the amount of current from the normal stacks is not the same, thus negatively influencing the life and efficiency of the stacks.

Consequently, to improve the life and efficiency of the whole fuel cell system, when the normal stacks are reconfigured, the normal stacks connected to the main power conversion system 100 may be arranged in n1×n2 array. Here, n1 and n2 are integers of 2 or more. In the present embodiment, n1 is 3 and n2 is 4.

In other words, the control unit 106 disconnects a predetermined number of stacks exceeding the number of normal stacks that are required to form the n1×n2 may from the main power conversion system 100 and may separately connect the disconnected normal stacks to the additional auxiliary power conversion system by controlling the operation of the upper layer reconfigurable switch network 110 to 113 and the operation of the lower layer reconfigurable switch network 201 to 205.

Figure 4D:
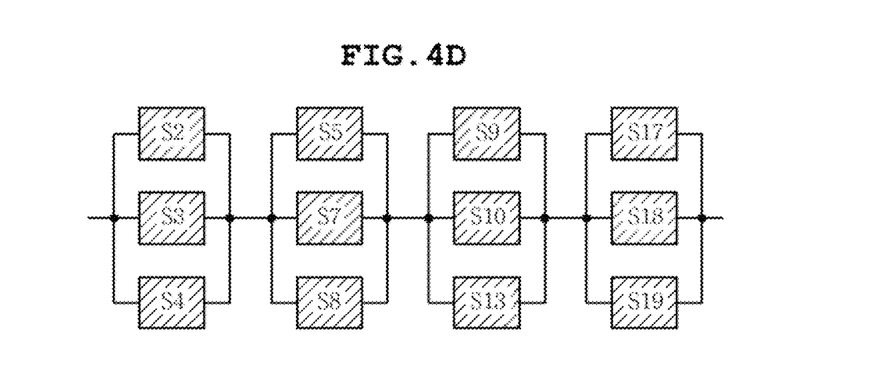
FIG. 4d is a view illustrating an optimized logical layout of normal stacks.
Figure 4E:
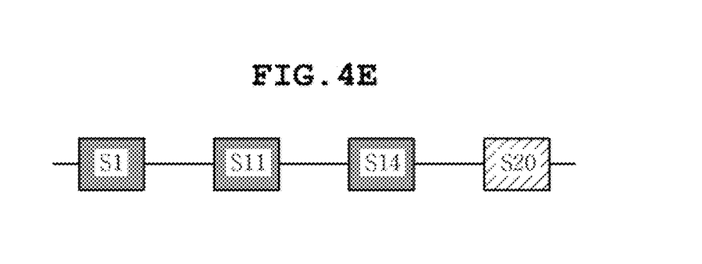
FIG. 4e is a view in which some normal stacks are connected to another stack.
Figure 5:
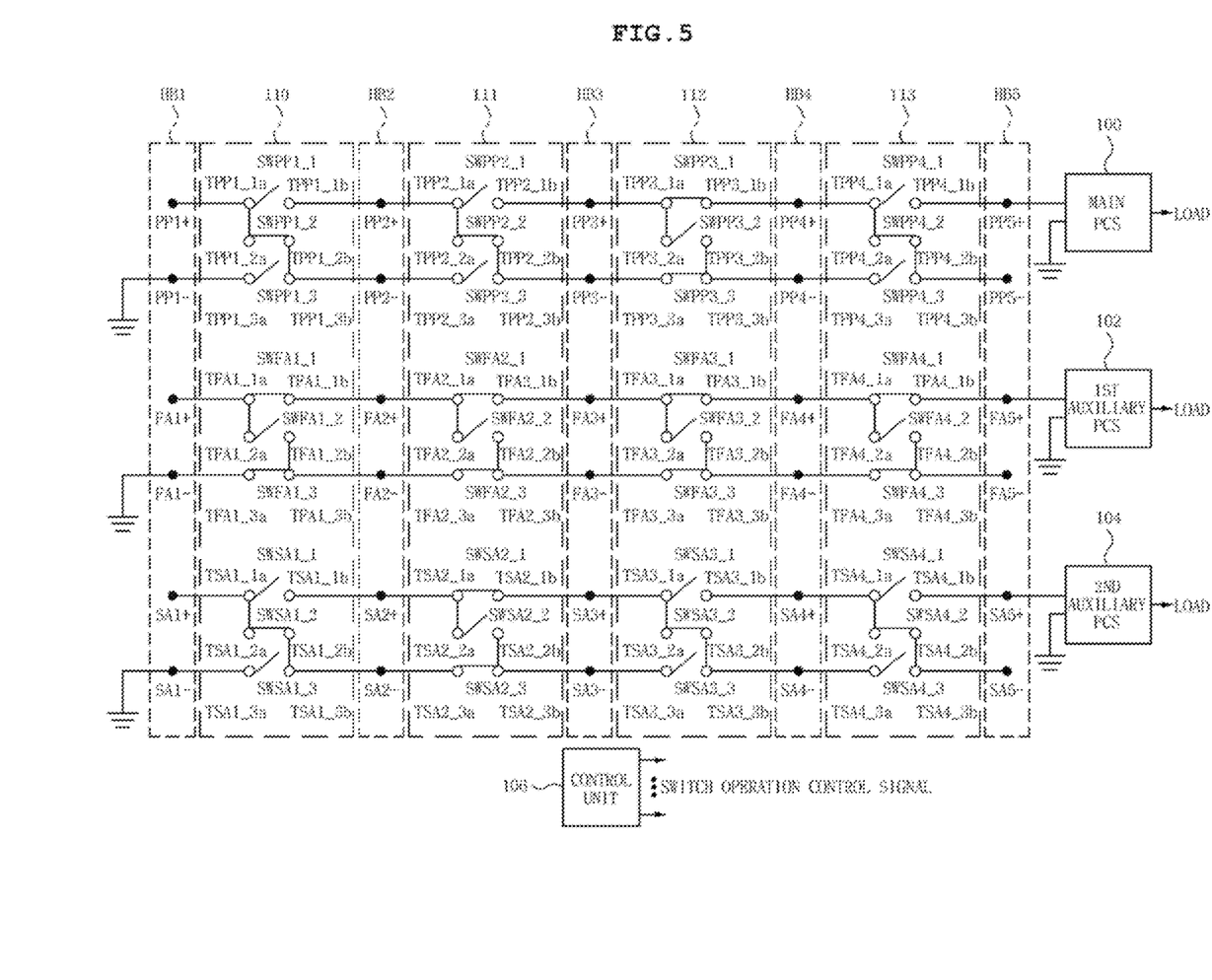
FIG. 5 is a view illustrating an apparatus for controlling a fuel cell system using a reconfigurable switch network according to an embodiment of the present invention when stacks are optimally reconfigured.
Figure 6:
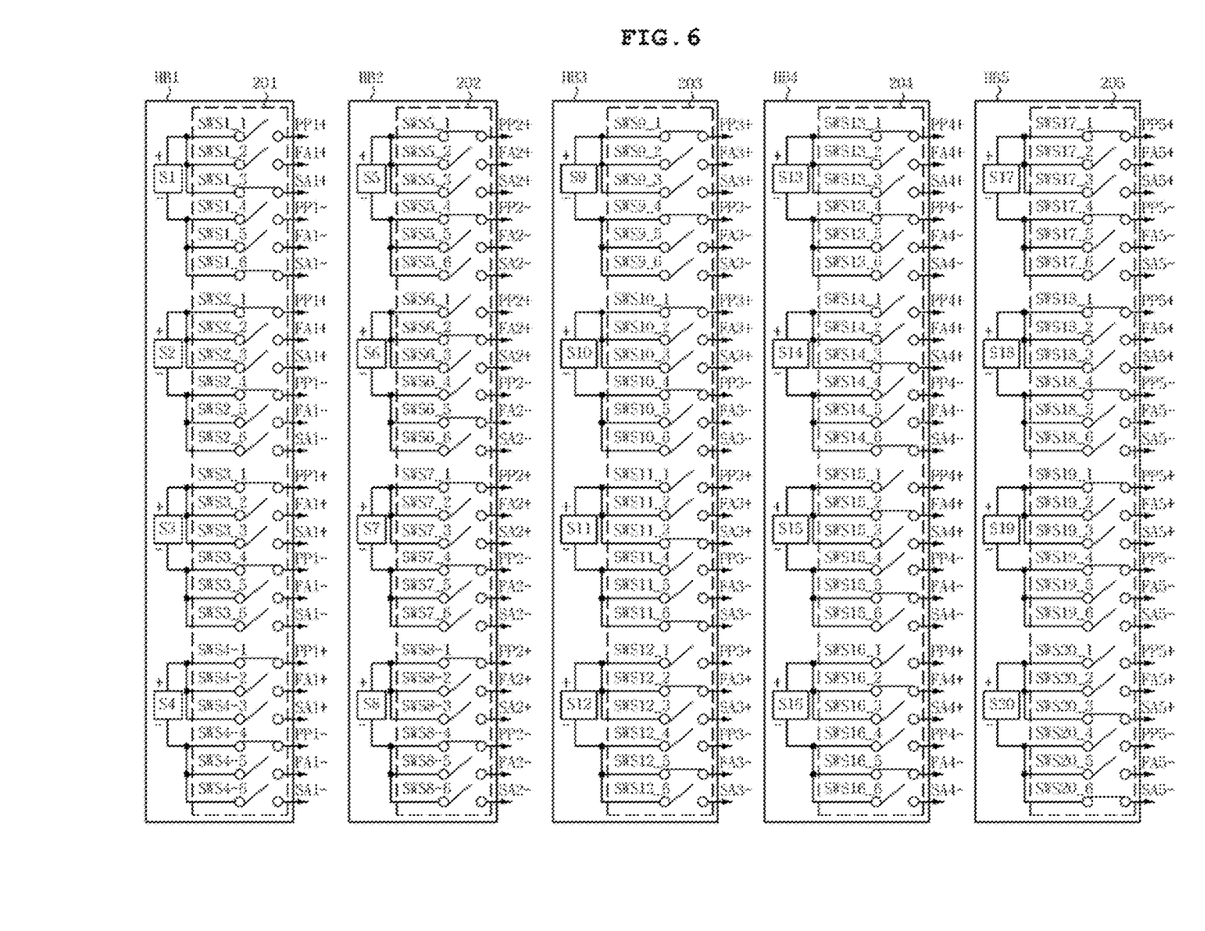
FIG. 6 is a view illustrating a connection of stacks in each hot box in an apparatus for controlling a fuel cell system using a reconfigurable switch network according to an embodiment of the present invention when stacks are optimally reconfigured.

In the embodiment of the present invention, to reconfigure the normal stacks in the 3×4 array as illustrated in FIG. 4d, the twentieth stack S20 that is an extra stack exceeding the twelve stacks required to form the 3×4 array is disconnected from the main power conversion system 100, and the disconnected normal stack, the twentieth stack S20, is reconfigured with the deteriorated stacks S1, S11, and S14 to be connected to the second auxiliary power conversion system 104 as shown in FIG. 4e. The operation of the switches for the above-mentioned reconfiguration is illustrated in FIGS. 5 and 6. A description of the operation of the apparatus for controlling the fuel cell system using a reconfigurable switch network according to an embodiment of the present invention when the stacks are optimally reconfigured, illustrated in FIGS. 5 and 6, is omitted.

In the embodiment of the present invention, the twentieth stack S20, which is an extra stack exceeding the twelve stacks required to form the 3×4 array, is reconfigured with the deteriorated stacks and then is connected to the second auxiliary power conversion system 104. However, not limited to this, it is possible to arrange an additional auxiliary power conversion system (not illustrated) and to connect the twentieth stack S20 to the additional auxiliary power conversion system to separately control the stack.

Figure 7:
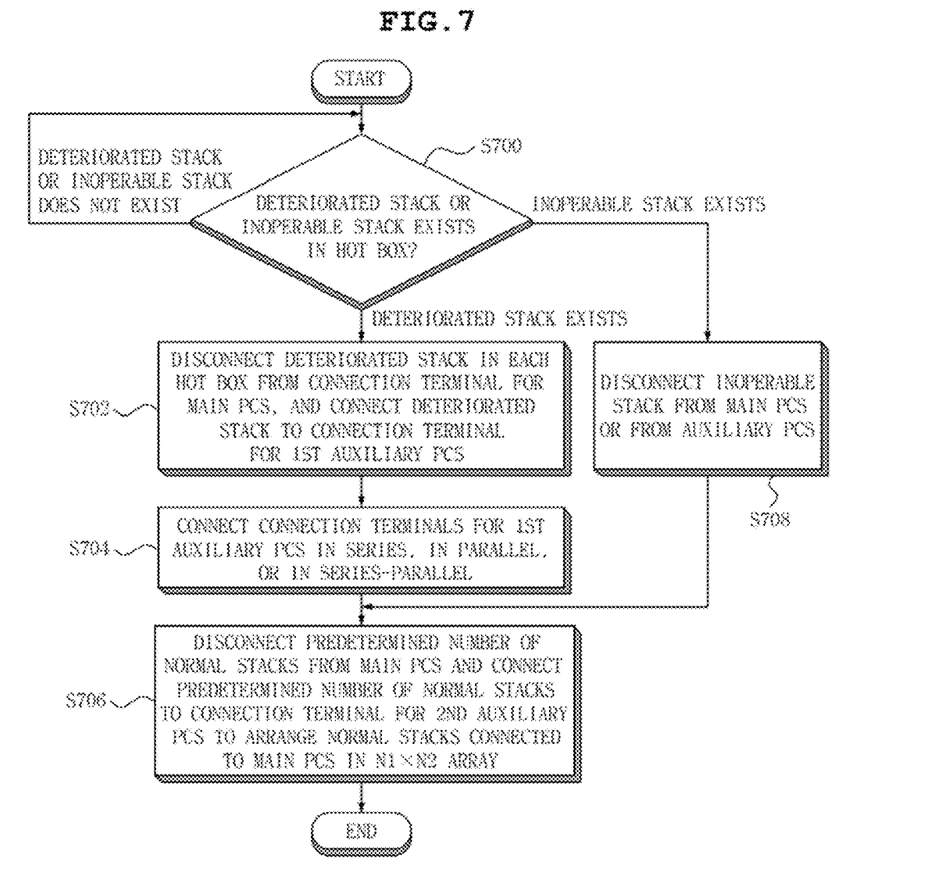
FIG. 7 is a view illustrating a method for controlling, a fuel cell system using a reconfigurable switch network according to an embodiment of the present invention.

A Method for Controlling a Fuel Cell System Using a Reconfigurable Switch Network FIG. 7 is a flow diagram illustrating a method for controlling a fuel cell system using a reconfigurable switch network according to an embodiment of the present invention.

In the method for controlling a fuel cell system using a reconfigurable switch network according to an embodiment of the present invention illustrated in FIG. 7, when deteriorated stacks exist, the deteriorated stacks are disconnected from the main power conversion system 100, and the deteriorated stacks are connected to the first auxiliary power conversion system 102. Also, the normal stacks configuring n1×n2 array are connected to the main power conversion system 100, and extra normal stacks, exceeding the number of normal stacks required to form the array, are connected to the second auxiliary power conversion system 104.

At step S700, the control unit 106 determines whether a deteriorated stack or a stack that cannot operate exists in the hot box including the first hot box HB1 to the fifth hot box HB5.

When a deteriorated stack exists in the hot box including the first hot box HB1 to fifth hot box HB5, the control unit 106 disconnects the deteriorated stack from the connection terminal for the main power conversion system PP1+ to PP5+ and PP1− to PP5− and connects the deteriorated stack to the connection terminal for the first auxiliary power conversion system FA1+ to FA5+ and FA1− to FA5− by controlling the operation of the lower layer reconfigurable switch network 201 to 205 disposed in each of the hot boxes at step S702.

At step S704, the control unit 106 connects the positive connection terminal for the first auxiliary power conversion system FA1+ to FA5+ and the negative connection terminal for the first auxiliary power conversion system FA1− to FA5− in series, in parallel, or in series-parallel by controlling the operation of the upper layer reconfigurable switch network 110 to 113 disposed between the hot boxes.

At step S706, by controlling the operation of the lower layer reconfigurable switch network 201 to 205 and the operation of the upper layer reconfigurable switch network 110 to 113, the control unit 106 reconfigures the normal stacks connected to the main power conversion system 100 in n1×n2 array; connects the reconfigured normal stacks to the connection terminal for the main power conversion system PP1+ to PP5+ and PP1− to PP5− to be connected to the main power conversion system 100; and disconnects a predetermined number of normal stacks that are not included in the array from the connection terminals for the main power conversion system PP1+ to PP5+ and PP1− to PP5− and connects the predetermined number of the normal stacks to the connection terminals for the second auxiliary power conversion system SA1+ to SA5+ and SA1− to SA5−.

When stacks that cannot operate exist in the hot box including the first hot box HB1 to the fifth hot box HB5, the control unit 106 disconnects the stacks from the connection terminals for the main power conversion system PP1+ to PP5+ and PP1− to PP5−, from the connection terminals for the first auxiliary power conversion system FA1+ to FA5+ and FA1− to FA5−, or from the connection terminals for the second auxiliary power conversion system SA1+ to SA5+ and SA1− to SA5− at step S708 by controlling the operation of the lower layer reconfigurable switch network 201 to 205 disposed in each of the hot boxes.

The apparatus and method for controlling a fuel cell system using a reconfigurable switch network according to an embodiment of the present invention may extend stack life in the fuel cell system and life of the whole fuel cell system.

When the apparatus and method for controlling a fuel cell system using a reconfigurable switch network according to an embodiment of the present invention are applied to the fuel cell system, it is confirmed by a simulation that life and operation time of the fuel cell system is exceptionally extended.

For example, for a structure in which four stacks are connected in series and the stacks connected in series are connected in parallel, when a general apparatus and method for controlling a fuel cell system is used, the fuel cell system may operate for 5,355 hours, whereas the fuel cell system applying the apparatus and method for controlling a fuel cell system using a reconfigurable switch network according to an embodiment of the present invention operates for 12,232 hours.

Although the embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for controlling a fuel cell system, the apparatus comprising:
multiple hot boxes, the hot box comprising:
multiple fuel cell stacks;
a connection terminal for a main power conversion system;
at least one connection terminal for an auxiliary power conversion system; and
a connection selecting switch unit connecting an output of each of the stacks in each of the hot boxes to the connection terminal for the main power conversion system, or to the at least one connection terminal for the auxiliary power conversion system;
a main power conversion system for supplying outputs of normal stacks among the multiple fuel cell stacks to a load;
at least one auxiliary power conversion system for supplying an output of at least one deteriorated stack among the multiple fuel cell stacks to a load;
at least one connection changing switch unit connecting in series or in parallel the connection terminal for the main power conversion system of any hot box to the connection terminal for the main power conversion system of an adjacent hot box, and connecting in series or in parallel the at least one connection terminal for the auxiliary power conversion system of any hot box to a corresponding connection terminal for the auxiliary power conversion system of an adjacent hot box; and
a control unit, when at least one deteriorated stack is detected, controlling the connection selecting switching unit and the at least one connection changing switch unit to disconnect an output of the at least one deteriorated stack from the main power conversion system and to connect the output of the at least one deteriorated stack to the at least one auxiliary power conversion system.

2. The apparatus of claim 1, wherein:
the connection terminal for the main power conversion system comprises a positive connection terminal for the main power conversion system and a negative connection terminal for the main power conversion system;
the at least one connection terminal for the auxiliary power conversion systems comprises a positive connection terminal for the auxiliary power conversion systems and a negative connection terminal for the auxiliary power conversion systems;
the connection selecting switch unit comprises:
a switch, for each of the fuel cell stacks, of which one end is connected to a positive voltage output terminal of the fuel cell stack and of which the other end is connected to the positive connection terminal for the main power conversion system;
a switch, for each of the fuel cell stacks, of which one end is connected to a positive voltage output terminal of the fuel cell stack and of which the other end is connected to the positive connection terminals for the auxiliary power conversion systems; and
a switch, for each of the fuel cell stacks, of which one end is connected to a negative voltage output terminal of the fuel cell stack and of which the other end is connected to the negative connection terminal for the main power conversion system;
a switch, for each of the fuel cell stacks, of which one end is connected to a negative voltage output terminal of the fuel cell stack and of which the other end is connected to the negative connection terminals for the auxiliary power conversion systems.

3. The apparatus of claim 1,
wherein each connection changing switch unit comprises:
a first switch for the main power conversion system, of which one end is connected to any positive connection terminal for the main power conversion system and of which the other end is connected to an adjacent positive connection terminal for the main power conversion system;
a second switch for the main power conversion system, of which one end is connected to the positive connection terminal for the main power conversion system and of which the other end is connected to an adjacent negative connection terminal for the main power conversion system; and
a third switch for the main power conversion system, of which one end is connected to a negative connection terminal for the main power conversion system and of which the other end is connected to the adjacent negative connection terminal for the main power conversion system;
at least one first switch for the auxiliary power conversion system, of which one end is connected to one of the positive connection terminals for the auxiliary power conversion system and of which the other end is connected to corresponding one of adjacent the positive connection terminals for the auxiliary power conversion system;
at least one second switch for the auxiliary power conversion system, of which one end is connected to the one of the positive connection terminals for the auxiliary power conversion system and of which the other end is connected to corresponding one of adjacent the negative connection terminals for the auxiliary power conversion system; and
at least one third switch for the auxiliary power conversion system, of which one end is connected to one of the negative connection terminals for the auxiliary power conversion system and of which the other end is connected to corresponding one of adjacent the negative connection terminals for the corresponding auxiliary power conversion system.

4. The apparatus of claim 3, wherein:
the first switch for the main power conversion system and the third switch for the main power conversion system operate in conjunction with each other depending on a same control signal, and
the at least one first switch for the auxiliary power conversion system and the at least one third switch for the auxiliary power conversion system operate in conjunction with each other depending on a same control signal.

5. The apparatus of claim 1,
wherein both the negative connection terminal for the main power conversion system in the first hot box of the multiple hot boxes and the negative connection terminals for the auxiliary power conversion systems in the first hot box of the multiple hot boxes are connected to a ground,
wherein the positive connection terminal for the main power conversion system in the last hot box of the multiple hot boxes is connected to the main power conversion system, and
wherein the positive connection terminals for the auxiliary power conversion system in the last hot box of the multiple hot boxes are connected to the auxiliary power conversion systems, respectively.

6. The apparatus of claim 1, wherein the control unit controls the connection selecting switching unit and the at least one connection changing switch unit to disconnect an output of at least one stack that cannot operate from the main power conversion system or from the at least one auxiliary power conversion system, when the at least one stack that cannot operate is detected.

7. The apparatus of claim 6, wherein the control unit controls the connection selecting switching unit and the at least one connection changing switch unit to disconnect the normal stacks that exceed the number of the normal stacks required to configure a array of (n1×n2) and to connect the disconnected normal stacks to the at least one auxiliary power conversion system, wherein n1 and n2 are integers of two or more.

8. The apparatus of claim 1, wherein the at least one deteriorated stack is connected in series, in parallel, or in series-parallel.

9. The apparatus of claim 1, wherein the normal stacks or the deteriorated stacks are connected in series, in parallel, or in series-parallel.

* * * * *